(12) United States Patent
Nurtsch

(10) Patent No.: US 12,506,210 B2
(45) Date of Patent: Dec. 23, 2025

(54) TRACTION BATTERY HOUSING FOR A MOTOR VEHICLE

(71) Applicant: Bayerische Motoren Werke Aktiengesellschaft, Munich (DE)

(72) Inventor: Bernd Nurtsch, Gars-Bahnhof (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 286 days.

(21) Appl. No.: 18/275,434

(22) PCT Filed: Apr. 6, 2022

(86) PCT No.: PCT/EP2022/059108
§ 371 (c)(1),
(2) Date: Aug. 2, 2023

(87) PCT Pub. No.: WO2022/218776
PCT Pub. Date: Oct. 20, 2022

(65) Prior Publication Data
US 2024/0039103 A1 Feb. 1, 2024

(30) Foreign Application Priority Data
Apr. 14, 2021 (DE) .................... 10 2021 109 394.5

(51) Int. Cl.
*H01M 50/24* (2021.01)
*B60L 50/64* (2019.01)
*H01M 50/249* (2021.01)

(52) U.S. Cl.
CPC ........... *H01M 50/249* (2021.01); *B60L 50/64* (2019.02); *H01M 50/24* (2021.01); *H01M 2220/20* (2013.01)

(58) Field of Classification Search
CPC .............. H01M 50/249; H01M 50/24; H01M 2220/20; B60L 50/64; B60K 2001/0438; B60K 1/04; B60Y 2306/01; Y02E 60/10
See application file for complete search history.

(56) References Cited

U.S. PATENT DOCUMENTS 9,281,505 B2* 3/2016 Hihara ................... B62D 25/20
10,886,513 B2* 1/2021 Stephens ............. H01M 50/224
(Continued)

FOREIGN PATENT DOCUMENTS

DE  10 2017 223 407 A1   6/2019
DE  10 2019 201 986 A1   8/2020
(Continued)

OTHER PUBLICATIONS

International Search Report (PCT/ISA/210) issued in PCT Application No. PCT/EP2022/059108 dated Jul. 29, 2022 with English translation (5 pages).
(Continued)

*Primary Examiner* — Justin Holmes
(74) *Attorney, Agent, or Firm* — Crowell & Moring LLP

(57) ABSTRACT

A traction battery housing for an electrically powered motor vehicle includes a base plate and a cover. The cover is fastened to the base plate. The base plate and the cover form a substantially closed housing. The base plate is load-bearing and/or load-absorbing, while the cover is substantially non-load-bearing and/or non-load-absorbing. Further, the base plate is preferably made of a fiber-reinforced plastic composite material.

19 Claims, 1 Drawing Sheet

(56) References Cited

U.S. PATENT DOCUMENTS

| | | | | |
|---|---|---|---|---|
| 2011/0143179 A1* | 6/2011 | Nakamori | ........... | H01M 50/271 |
| | | | | 429/99 |
| 2012/0103714 A1* | 5/2012 | Choi | ........................ | B60K 1/04 |
| | | | | 180/68.5 |
| 2019/0081298 A1* | 3/2019 | Matecki | .................. | B60R 19/12 |
| 2021/0162849 A1 | 6/2021 | Kerstan et al. | | |

FOREIGN PATENT DOCUMENTS

| | | |
|---|---|---|
| EP | 3 070 763 A1 | 9/2016 |
| WO | WO 2018/202813 A2 | 11/2018 |
| WO | WO 2021/034420 A1 | 2/2021 |

OTHER PUBLICATIONS

German-language Written Opinion (PCT/ISA/237) issued in PCT Application No. PCT/EP2022/059108 dated Jul. 29, 2022 (7 pages).
German-language Search Report issued in German Application No. 10 2021 109 394.5 dated Feb. 28, 2022 with partial English translation (11 pages).

* cited by examiner

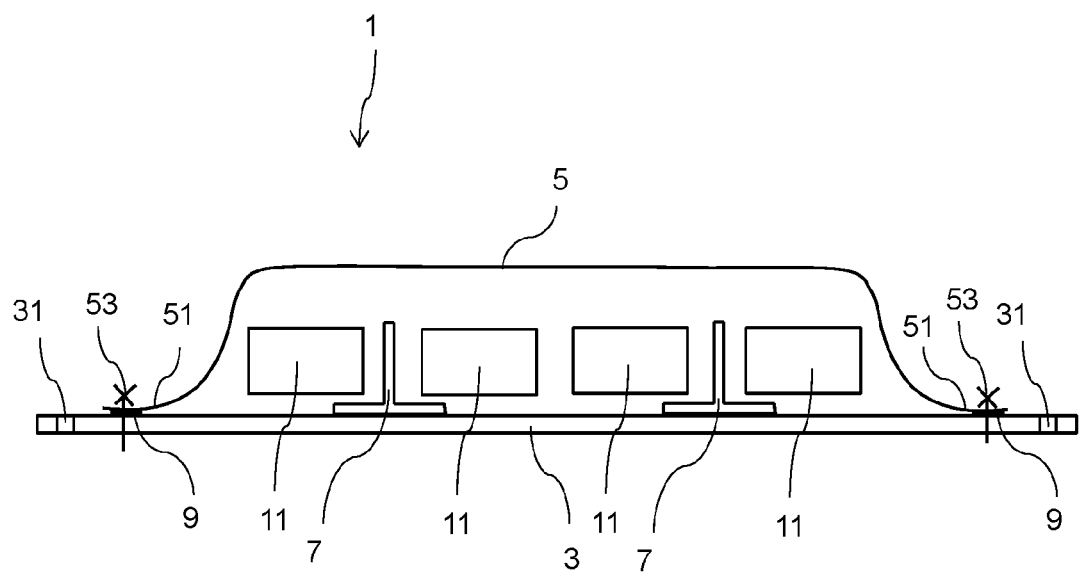

TRACTION BATTERY HOUSING FOR A MOTOR VEHICLE

BACKGROUND AND SUMMARY

The present invention relates to a drive battery housing for a motor vehicle.

A motor vehicle having an electric drive usually has a drive battery which has a drive battery housing, in which battery modules or battery cells, an electric unit/electronic unit, and a cooling device are arranged. The drive battery housing is in turn mounted under a base subassembly on a vehicle body. The known drive battery housing comprises, for example, aluminum and has lateral carriers, a cover and a base. The lateral carriers are, for example, in the form of extruded profile members or cast members.

As set out in DE 10 2017 223 407 A1, a known drive battery housing has longitudinal carriers and a plurality of transverse carriers which extend between the longitudinal carriers. Furthermore, the drive battery housing has an upper wall and a lower wall which are each connected at least to an external carrier structure, that is to say, the external longitudinal carriers and the external transverse carriers. The longitudinal carriers and also the transverse carriers are made from extruded profile-members.

An object of the present invention is to provide a drive battery housing for a motor vehicle and a motor vehicle having a drive battery housing, wherein the drive housing is constructed more simply, is more cost-effective to produce, and has a low weight with adequate rigidity.

This object is achieved by a drive battery housing and by a motor vehicle having such a drive battery housing, in accordance with the independent claims. Advantageous embodiments of the invention are set out in the dependent patent claims.

A drive battery housing according to the invention for an electrically driven motor vehicle has a base plate and a cover. The cover is fixed to the base plate. The base plate and the cover form a substantially closed housing. The base plate is constructed in a load-bearing and/or load-carrying manner and the cover is substantially not constructed in a load-bearing and/or load-carrying manner. Furthermore, the base plate is preferably made from a plastics fiber composite material.

As a result of this construction of a load-bearing/load-carrying base plate and a cover which is only sufficiently inherently rigid, the weight of the battery housing can be reduced and the production costs can also be reduced. The simple construction of the base plate and cover further allows greater tolerance deviations of the components than with the conventional construction of the drive battery housing. As a result of the closed housing, the interior of the battery housing is protected from environmental influences. As a result of the two-piece structure of the drive battery housing comprising a base plate and a cover, a fluid-tightness of the drive battery housing can further be produced more simply.

The term "load-bearing or load-carrying" is intended to be understood to mean that the base plate can absorb and transmit collision loads of the motor vehicle and/or loads which occur during travel operation of the motor vehicle (operating loads). On the other hand, the cover is not configured in a load-bearing or load-carrying manner, that is to say, the cover is not configured to absorb and transmit collision loads or operating loads of the motor vehicle. The cover is preferably configured to be at least sufficiently inherently rigid, but is not configured to increase a body rigidity or collision strength of the motor vehicle.

The base plate of the drive battery housing is preferably arranged in such a manner that it extends, in the state fitted in the motor vehicle, substantially parallel with an x-y plane of the motor vehicle, that is to say, parallel with a longitudinal direction and a transverse direction of the motor vehicle. In this instance, the cover can extend upward or downward from the base plate.

The cover can be adhesively-bonded to the base plate. However, the cover may also alternatively or additionally be connected to the base plate with screws or similar fixing means. A seal may be arranged between the base plate and the cover.

The cover is preferably not connected directly to the motor vehicle in the fitted state of the drive battery housing in the motor vehicle, but instead is simply connected via the base plate to the motor vehicle.

Preferably, the cover is produced via a deep-drawing method from a metal material, for example, steel or aluminum. However, the cover may also be made from a plastics material.

According to a preferred further development, the base plate is constructed in a substantially planar manner. The base plate can thereby be produced simply and without complex forming methods.

Furthermore, the drive battery housing can be constructed to be fluid-tight, that is to say, sealed with respect to fluids or gases. However, this does not exclude the fact that the drive battery housing may have a selective ventilation or aeration.

According to a preferred further development, the base plate has a multi-layered construction. A multi-layered construction is also referred to as a sandwich-like construction. The plurality of layers are connected to each other in a materially engaging manner in this case. Furthermore, a so-called spacing layer, which is not made from a solid material but instead has empty spaces, can be located in the core of the sandwich-like construction. Such a spacing layer can have an undulating structure or a honeycomb structure. A torsional rigidity and flexural rigidity of the base plate can thereby be increased for the smallest possible weight.

According to another preferred further development, a reinforcement structure is fixed on the base plate. The base plate or the drive battery housing is thereby further reinforced.

The reinforcement structure may have a retention function for components of the battery, that is to say, battery cells, battery modules, electric unit/electronic unit, temperature control devices (in particular cooling devices), etc.

The reinforcement structure may advantageously be connected to the base plate in a materially engaging manner.

The reinforcement structure may be a carrier. The carrier can be arranged in the longitudinal direction of the drive battery housing or in the transverse direction of the drive battery housing. The longitudinal direction of the drive battery housing corresponds to the longitudinal direction of the motor vehicle (x direction) in the fitted state of the drive battery housing. The transverse direction of the drive battery housing accordingly corresponds to the transverse direction of the motor vehicle (y direction) in the fitted state of the drive battery housing.

The carrier may be in the form of a T-shaped carrier, in particular a double T-shaped carrier.

A rigidity of the drive battery housing is also thereby further increased. A double T-shaped carrier increases a rigidity and allows additional possible fixing methods for components of the drive battery.

The reinforcement structure may also be constructed from a plurality of carriers which are arranged, for example, parallel with each other.

Battery cells or battery modules comprising a plurality of battery cells can be arranged in the empty spaces between the carriers or alongside the carrier(s).

The reinforcement structure may also be a grid-like or honeycomb-like structure, in which battery cells or battery modules comprising a plurality of battery cells are received.

In an advantageous manner, the reinforcement structure is not connected to the cover, or at least not in a materially engaging manner.

Battery cells or battery modules or other components of the battery can be fixed to the reinforcement structure and/or to the base plate.

In a particularly advantageous manner, the base plate is constructed in such a manner that it can be connected to a body of the motor vehicle. In other words, the base plate has body connection means.

The drive battery housing, in particular the base plate, is advantageously constructed in such a manner that it can be integrated in the body of the motor vehicle.

In this case, the drive battery housing is preferably fixed to the body only via the base plate.

Only component tolerances of the base plate are thereby relevant to a connection to the body of the vehicle. Component tolerances of the cover are advantageously not significant.

Preferably, the base plate reinforces the body.

As a result, the base plate of the drive battery housing contributes to a rigidity of the body and therefore performs the function of a carrying body component.

The base plate is integrally constructed according to a preferred further development.

According to another aspect, the invention relates to a motor vehicle, in particular a passenger vehicle, having a drive battery housing as described above.

Further developments of the invention as set out above can be freely combined with each other where possible and advantageous.

BRIEF DESCRIPTION OF THE DRAWING

FIG. 1 schematically shows a sectioned view of a drive battery housing according to an embodiment of the present invention.

DETAILED DESCRIPTION OF THE DRAWING

A description of an embodiment of the invention follows with reference to FIG. 1.

FIG. 1 shows a drive battery housing 1 for an electrically driven motor vehicle, in particular a passenger vehicle. The drive battery housing 1 has a base plate 3 and a cover 5. The cover 5 is fixed to the base plate 3. The base plate 3 and the cover 5 form a housing which is substantially closed. The term "substantially closed" is intended to be understood to mean that the housing is configured in a substantially fluid-tight manner, which does not exclude that the housing has a selective ventilation or aeration device by means of a valve or the like. The base plate 3 is constructed in a load-bearing and/or load-carrying manner. However, the cover 5 is substantially not constructed in a load-bearing and/or load-carrying manner but is instead simply provided with sufficient inherent rigidity. The rigidity and strength of the drive battery housing 1 is accordingly substantially formed by the base plate 3 while the cover 5 simply contributes to a closed and fluid-tight inner space of the drive battery housing 1.

The base plate 3 is made from a plastics fiber composite material. In this case, a thermoplastic or duroplastic plastics material can be used as the plastics matrix. Continuous fibers, long fibers or short fibers can be used as reinforcing fibers. Preferably, carbon fibers are used since they have a particularly good tensile strength with a low weight. However, it is also possible to use other fibers, such as glass fibers or organic fibers. The base plate 3 can be formed from a so-called organic sheet. The base plate 3 can also be constructed in a sandwich-like manner from a plurality of identical or different layers or plies. The base plate 3 is constructed to be substantially planar.

The cover 5 is fixed to the base plate 3 via a circumferential flange 51. In particular, the flange 51 is screwed to the base plate 3 by means of screws 53. A seal 9 (or a bead of glue comprising an adhesive) is arranged between the flange 51 and the base plate 3. The cover 5 is in the form of a deep-drawn metal sheet.

T-shaped carriers 7, which are arranged parallel with each other and which extend in the longitudinal direction of the drive battery 1, are adhesively bonded to the base plate 3 as reinforcement structures. The T-shaped carriers 7 are simply connected to the base plate 3 and not to the cover 5. In order to achieve adequate torsional and flexural rigidity, the base plate 3 has a substantially greater wall thickness than the cover 5. In addition, the T-shaped carriers 7 increase the torsional and flexural rigidity of the base plate 3.

The base plate 3 is screwed to a base group of a body of the motor vehicle via corresponding fixing holes 31 at the edges thereof under a vehicle passenger compartment. In this case, the base plate 3 extends substantially over the entire width or at least over almost the entire width of the base group. Furthermore, the base plate 3 extends over a region in the longitudinal direction of the motor vehicle between a front axle and a rear axle of the motor vehicle.

Battery modules 11 with battery cells are arranged between the T-shaped carriers 7 and alongside the T-shaped carriers 7. The battery modules 11 are fixed directly to the base plate 3 or the reinforcement structure 7, but not to the cover 5. Other components of the battery, such as a cooling system and an electric/electronic power unit, are also received in the drive battery housing 1 and fixed either directly to the base plate 3 or to the reinforcement structure 7.

The drive battery housing 1 can be fixed to the base subassembly of the motor vehicle with the cover 5 directed upwardly or with the cover 5 directed downwardly. A height of the cover 5 is formed in accordance with a height of the battery modules 11 or battery cells which are intended to be used. Thus, using the same base plate 3 and the same reinforcement structure and using a higher cover 5, it is possible with simple means to provide a higher drive battery housing 1. In this case, the reinforcement structure can be adapted with corresponding reinforcement structure adapters at a height. For example, an additional T-shaped carrier or double T-shaped carrier could be positioned on a double T-shaped carrier. This has advantages with regard to a modular construction of the drive housing for vehicle types with different heights, wherein the base plate can be used as an identical part.

The invention claimed is:

1. A drive battery housing for an electrically driven motor vehicle, comprising:

a base plate;
a cover; and
a reinforcement structure comprising a T-shaped carrier; wherein
the cover is fixed to the base plate,
the reinforcement structure is fixed to the base plate,
the reinforcement structure is not connected to the cover in any materially engaging manner,
the base plate and the cover form a substantially closed housing,
the base plate is constructed in a load-bearing and/or load-carrying manner,
the cover is substantially not constructed in a load-bearing and/or load-carrying manner, and
the base plate is made from a plastics fiber composite material.

2. The drive battery housing according to claim 1, wherein the base plate is substantially planar.

3. The drive battery housing according to claim 1, wherein the drive battery housing is fluid-tight.

4. The drive battery housing according to claim 1, wherein the base plate has a multi-layered construction.

5. The drive battery housing according to claim 1, wherein the base plate is planar.

6. The drive battery housing according to claim 1,
the reinforcement structure comprises a plurality of T-shaped carriers arranged parallel to one another.

7. The drive battery housing according to claim 6, wherein battery modules are fixed directly to the plurality of T-shaped carriers.

8. The drive battery housing according to claim 1, wherein the base plate is configured to be connectable to a body of the motor vehicle.

9. The drive battery housing according to claim 1, wherein the base plate is integrally constructed.

10. A motor vehicle, comprising:
a vehicle body; and
a drive battery housing, the drive battery housing comprising:
a base plate;
a cover; and
a reinforcement structure comprising a T-shaped carrier; wherein
the cover is fixed to the base plate,
the reinforcement structure is fixed to the base plate,
the reinforcement structure is not connected to the cover in any materially engaging manner,
the base plate and the cover form a substantially closed housing,
the base plate is constructed in a load-bearing and/or load-carrying manner,
the cover is substantially not constructed in a load-bearing and/or load-carrying manner, and
the base plate is made from a plastics fiber composite material.

11. The motor vehicle according to claim 10, wherein the motor vehicle is an electrically driven motor vehicle.

12. The motor vehicle according to claim 10, wherein the base plate is substantially planar.

13. The motor vehicle according to claim 10, wherein the drive battery housing is fluid-tight.

14. The motor vehicle according to claim 10, wherein the base plate has a multi-layered construction.

15. The motor vehicle according to claim 10, wherein the base plate is planar.

16. The drive battery housing according to claim 15, wherein
the reinforcement structure comprises a plurality of T-shaped carriers arranged parallel to one another.

17. The motor vehicle according to claim 16, wherein
battery modules are fixed directly to the plurality of T-shaped carriers.

18. The motor vehicle according to claim 10, wherein the base plate is integrally constructed.

19. The motor vehicle according to claim 10, wherein the base plate is connected to the vehicle body.

* * * * *